United States Patent
Wang et al.

(10) Patent No.: US 9,357,226 B2
(45) Date of Patent: May 31, 2016

(54) GENERATING ENTROPY ENCODED DATA INDEXING AUXILIARY INFORMATION TO ASSIST QUICK JPEG DECODING AT JPEG ENCODING PHASE

(75) Inventors: Congxiu Wang, Fremont, CA (US); Peihua Feng, Zhejiang (CN); Ping Xiao, Shanghai (CN); Yingfeng Su, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 1277 days.

(21) Appl. No.: 12/838,437

(22) Filed: Jul. 17, 2010

(65) Prior Publication Data

US 2011/0013850 A1  Jan. 20, 2011

Related U.S. Application Data

(60) Provisional application No. 61/226,585, filed on Jul. 17, 2009.

(51) Int. Cl.
*G06K 9/36* (2006.01)
*H04N 19/46* (2014.01)
*H04N 19/60* (2014.01)
*H04N 19/68* (2014.01)

(52) U.S. Cl.
CPC .............. *H04N 19/46* (2014.11); *H04N 19/60* (2014.11); *H04N 19/68* (2014.11)

(58) Field of Classification Search
USPC ................. 382/232–233, 235, 238, 250–251
See application file for complete search history.

(56) References Cited

U.S. PATENT DOCUMENTS

| | | | | |
|---|---|---|---|---|
| 6,525,722 B1 * | 2/2003 | Deering | ......................... | 345/419 |
| 7,035,483 B2 * | 4/2006 | Yamashiro et al. | ........... | 382/318 |
| 7,149,811 B2 * | 12/2006 | Wise et al. | .................... | 709/247 |
| 7,155,063 B2 * | 12/2006 | Chiba | ........................... | 382/233 |
| 7,185,264 B2 * | 2/2007 | Chiba | ........................... | 714/768 |
| 2002/0083204 A1 * | 6/2002 | Jeong et al. | ................... | 709/247 |

* cited by examiner

*Primary Examiner* — Weiwen Yang
(74) *Attorney, Agent, or Firm* — Patent Law Group LLP; David C. Hsia

(57) ABSTRACT

A JPEG encoding process may generate entropy encoded data indexing auxiliary information. With the assistance of such auxiliary information, a quick JPEG decoder is implemented to significantly improve the performance of processing large sized JPEG images on the mobile systems with limited computation power.

3 Claims, 6 Drawing Sheets

GENERATING ENTROPY ENCODED DATA INDEXING AUXILIARY INFORMATION TO ASSIST QUICK JPEG DECODING AT JPEG ENCODING PHASE

CROSS REFERENCE TO RELATED APPLICATIONS

This application claims the benefit of U.S. Provisional App. No. 61/226,585, filed on Jul. 17, 2009, which is incorporated herein by reference.

This application is related to U.S. Pat. No. 7,391,913, and U.S. Pat. No. 7,668,385, which are commonly assigned and incorporated herein by reference.

FIELD OF PRESENT DISCLOSURE

This present disclosure relates to Joint Photographic Expert Group (JPEG) encoding and decoding processes.

DESCRIPTION OF RELATED ART

JPEG is designed to manipulate the characteristics of the human visual system. JPEG does this by discarding data conveying slight variances in color (e.g., chrominance) that are not easily recognizable to the human eyes to achieve greater compression of image data.

FIG. 1 is a flowchart of a conventional method 10 for a JPEG codec. In steps 12 to 20, the codec encodes a source image 40 shown in FIG. 2 into a bitstream of compressed data. In steps 22 to 30, the codec decodes the bitstream.

In step 12, the codec optionally converts the RGB (red, green, and blue) values of the pixels in source image 40 to YCbCr (luminance and chrominance) values. The codec separates the Y, Cb, and Cr components into three planes. Typically the codec fully samples the Y values but downsamples the Cb and the Cr values. The codec then splits the Y, Cb, and Cr planes into blocks of 8×8 pixels and interleaves the blocks to form minimum coded units (MCUs). For a typical 4:2:0 downsampling where Cb and Cr are reduced by a factor of 2, each MCU represents a tile of 16×16 pixels on the source image and consists four Y blocks, one Cr block, and one Cb block. FIG. 3 illustrates source image 40 divided into MCUs 1, 2, 3, and 4 where MCU 1 consists of blocks Y1, Y2, Y3, Y4, Cr1, and Cb1, MCU 2 consists of blocks Y5, Y6, Y7, Y8, Cr2, and Cb2.

In steps 16 to 20, the codec encodes one MCU at a time. Within the MCU, the system encodes one 8×8 block at a time.

In step 16, the codec performs forward discrete cosine transformation (FDCT) to convert an 8×8 block to DCT coefficients consisting of one DC coefficient and 63 AC coefficients.

In step 18, the codec performs quantization to the DCT coefficients.

In step 20, the codec encodes the quantized DC coefficient as a difference from the prior DC term of the previous 8×8 block in the encoding order, places the DCT coefficients in a zigzag sequence, and preforms entropy encoding (e.g., Huffman encoding) to the DCT coefficients.

The codec also inserts markers into a bitstream 42, such as restart markers, as shown in FIG. 4. Restart (RST) markers are provided as a means for detection and recovery after bitstream errors, such as transmission over an unreliable network or file corruption. Restart markers are inserted periodically in the bitstream. The number of MCUs between the restart markers is provided in a define restart interval (DRI) marker in the file header. Restart markers are usually used in coding of large images.

As mentioned above, the quantized DC coefficient is encoded as the difference from the DC term of the previous 8×8 block in the encoding order rather than as absolute values. At each restart marker, the DC difference is rest to zero and the bitstream is synchronized to a byte boundary. In other words, the runs of MCUs between restart markers can be independently decoded.

After encoding all the MCUs that make up source image 40, the codec has generated a bitstream of compressed data where boundaries between the MCUs are not known because the MCUs do not have a fixed size and there are no markers demarcating the boundaries of the MCUs.

In steps 22 to 26, the codec decodes one MCU at a time. Within the MCU, the system decodes one 8×8 block at a time.

In step 22, the codec performs entropy decoding (e.g., Huffman decoding) to the bitstream of compressed data. By performing entropy decoding, the system is able to extricate the MCUs in the order which they were encoded in the bitstream. However, the system cannot extricate one MCU before it entropy decodes one or more preceding MCUs in the bitstream because the encoded MCUs do not have a fixed size and there are no markers demarcating their boundaries. Thus, even though if only one MCU is requested to be decoded, all preceding MCUs in the bitstream must be entropy decoded in order to extricate the requested MCU. This requires the system to have sufficient CPU speed and memory to handle the entropy decoding of all the preceding MCUs.

In step 24, the codec performs dequantization to the quantized DCT coefficients.

In step 26, the codec performs inverse discrete cosine transformation (IDCT) to the DCT coefficients.

In step 28, the codec upsamples the Cr and the Cb values.

In step 30, the codec converts the YCbCr values to RGB values so source image 40 can be displayed.

FIG. 5 is a block diagram of a conventional encoder 50 for a JPEC codec. Encoder 50 includes a FDCT and quantization encoder 52 that receives source image 40 and generate quantized DCT coefficients, and an entropy encoder 54 that receives the quantized DCT coefficients and generates bitstream 42 of compressed data.

FIG. 6 is a block diagram of a conventional decoder 60 for the JPEG codec. Decoder 60 includes an entropy decoder 62 that receives bitstream 42 of compressed data and generates quantized DCT coefficients, and a dequantization and inversed DCT decoder 64 that receives the quantized DCT coefficients and generates a lossy copy 40' of source image 40.

Unless stated otherwise, use of the same variable names in figures and equations do not indicate the same variables when the variable names appear in different methods in embodiments of the present disclosure.

DETAILED DESCRIPTION

Figure 1:
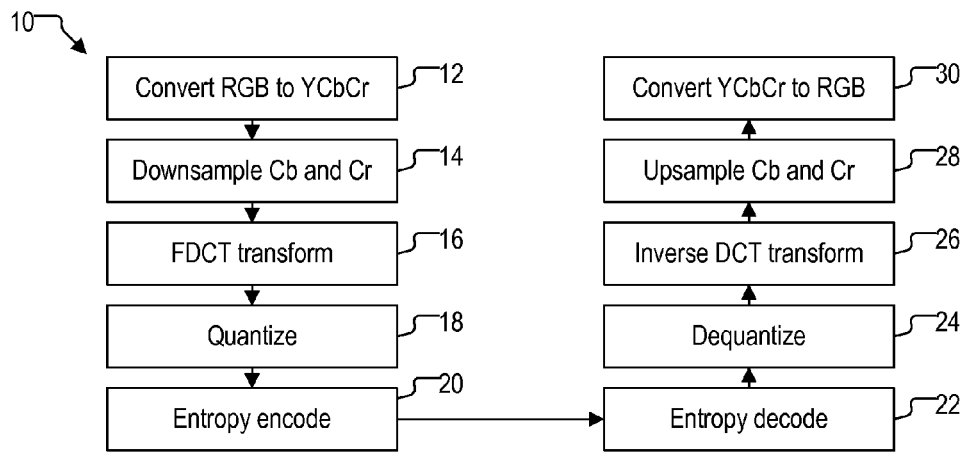
FIG. 1 is a flowchart of a conventional method for a JPEG codec.
Figure 2:
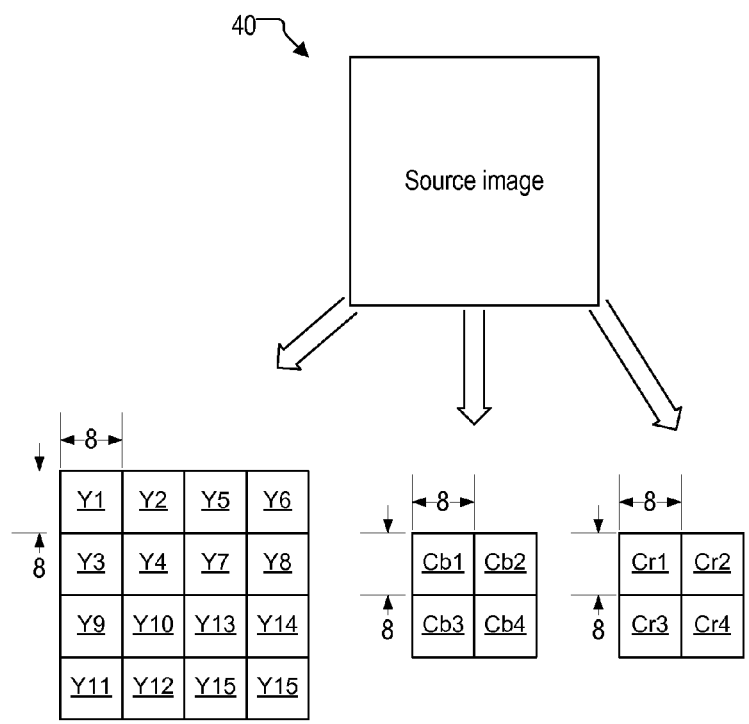
FIG. 2 illustrates a subsampling of a source image in the method of FIG. 1.
Figure 3:
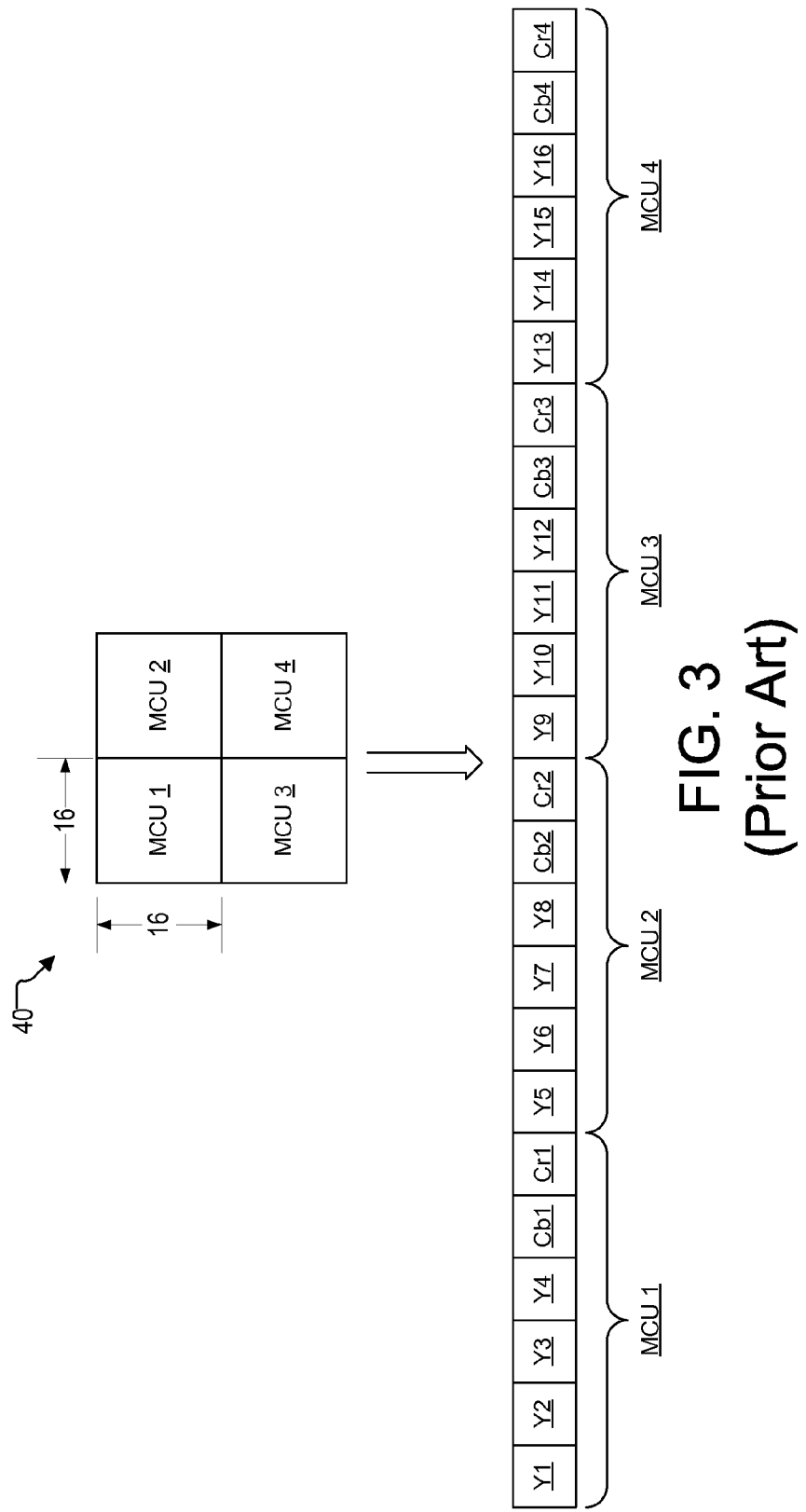
FIG. 3 illustrates an interleaving of blocks from the source image to form minimum coded units in the method of FIG. 1.
Figure 4:
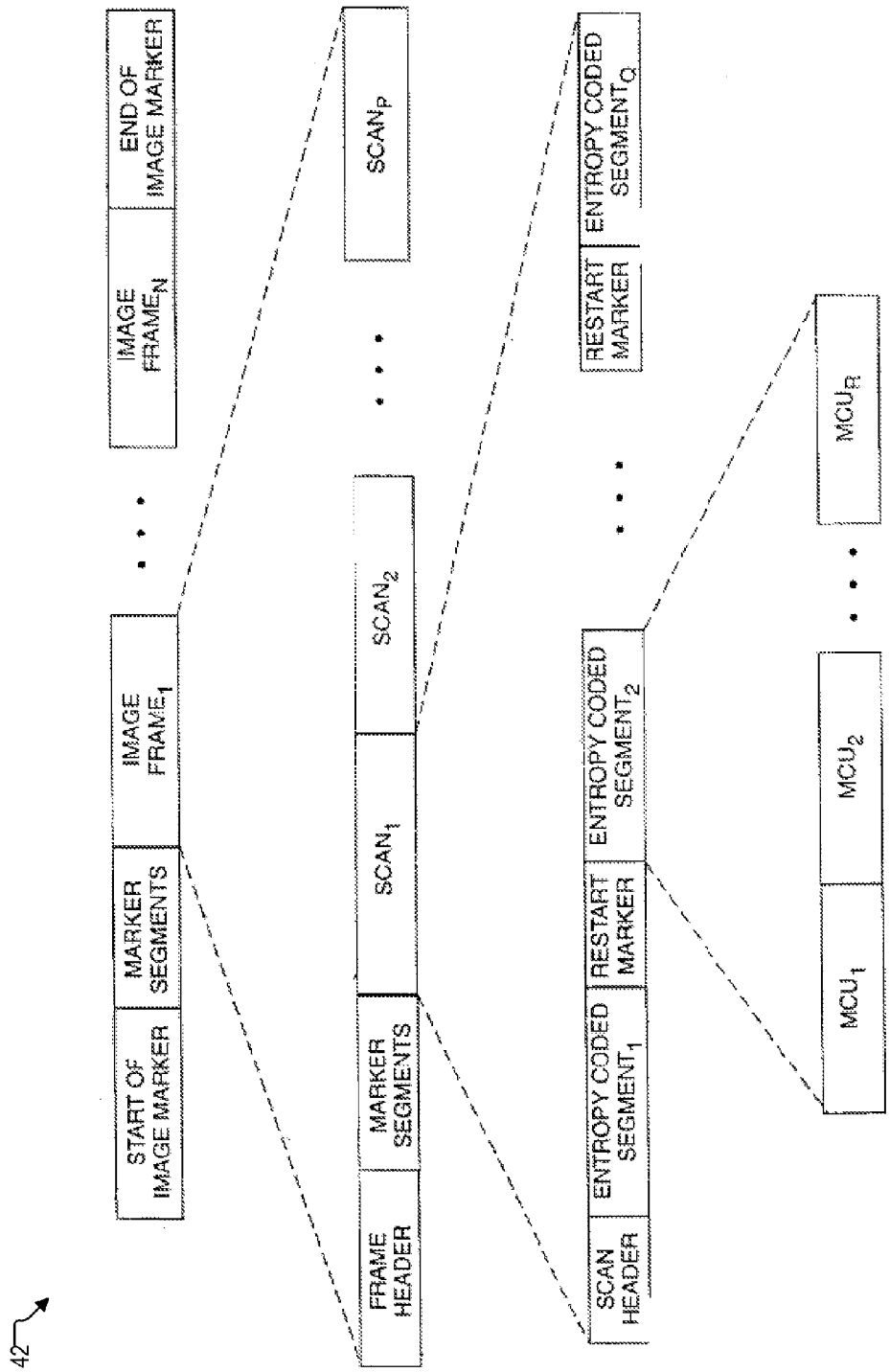
FIG. 4 illustrates a bitstream generated by the method of FIG. 1.
Figure 5:
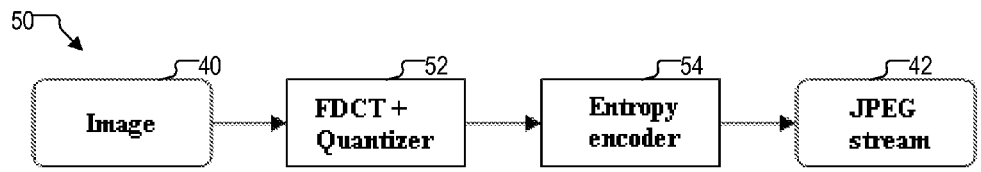
FIG. 5 is a block diagram of a conventional encoder of the JPEG codec.
Figure 6:
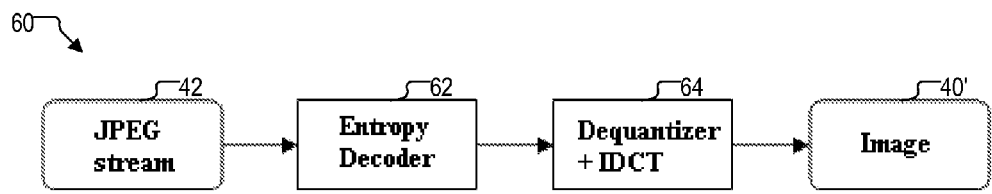
FIG. 6 is a block diagram of a conventional decoder of the JPEG codec.
Figure 7:
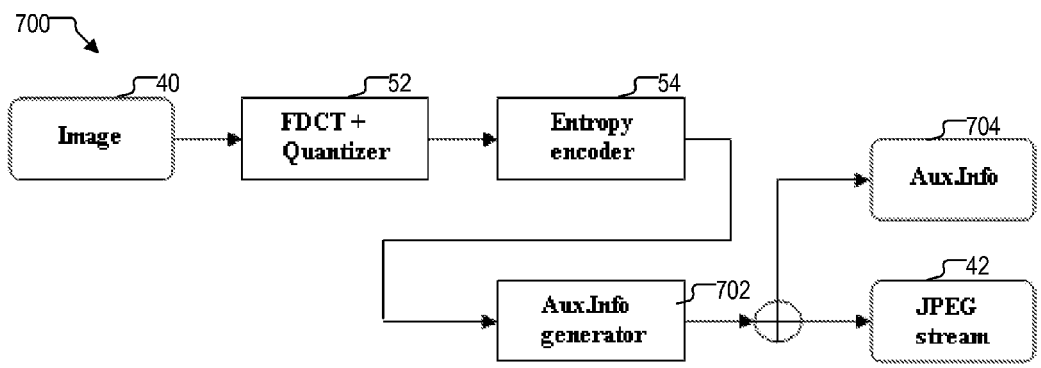
FIG. 7 is a block diagram of an encoder with an auxiliary information generator in a JPEG codec of one or more embodiments of the present disclosure.

FIG. 7 is a block diagram of an encoder 700 with an auxiliary information generator 702 in a JPEG codec of one or more embodiments of the present disclosure. The JPEG codec may be implemented in software by processor and memory or dedicated hardware. Encoder 700 outputs bitstream 42 of compressed data and auxiliary information 704 including a restart marker index. Auxiliary information 704 enables a quick decode of bitstream 42.

Encoder 700 includes FDCT and quantization encoder 52 that receives source image 40 and generate quantized DCT coefficients, and entropy encoder 54 that receives the quantized DCT coefficients and generates bitstream 42 of compressed data. Auxiliary information generator 702 receives bitstream 42, searches for the define restart interval marker and the restart markers in the bitstream, and generates auxiliary information 704 based on the restart interval marker and the restart markers. Auxiliary information 704 includes the number of MCUs between the restart markers, also known as the restart interval, the total number of restart markers in the bitstream, and the bit offsets to the restart markers in bitstream 42. The bit offsets may be from the start of the bitstream or any subsequent marker. Auxiliary information generator 702 may insert auxiliary information 704 as a reserved segment in bitstream 42. Entropy encoder 54 then transmits bitstream 42 over a wired or wireless medium, or saves the bitstream in a nonvolatile medium.

Figure 8:
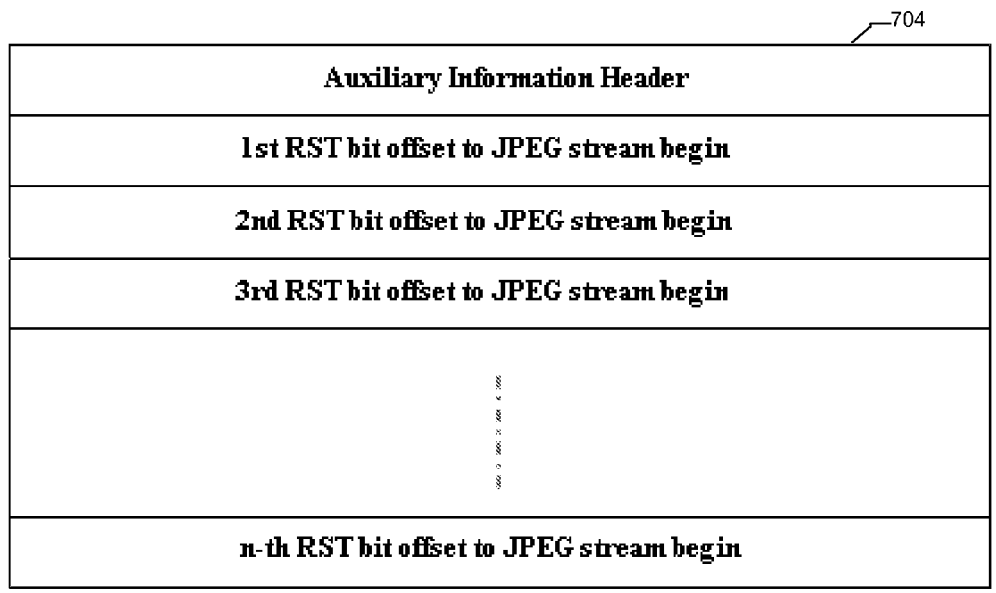
FIG. 8 illustrates an auxiliary information of FIG. 7 in one or more embodiments of the present disclosure.

FIG. 8 illustrates auxiliary information 704 in one or more embodiments of the present disclosure. Auxiliary information 704 includes an auxiliary information header that stores the restart interval and the total number of restart markers in the bitstream. Auxiliary information header is followed by the bit offsets to the restart markers in the bitstream.

Figure 9:
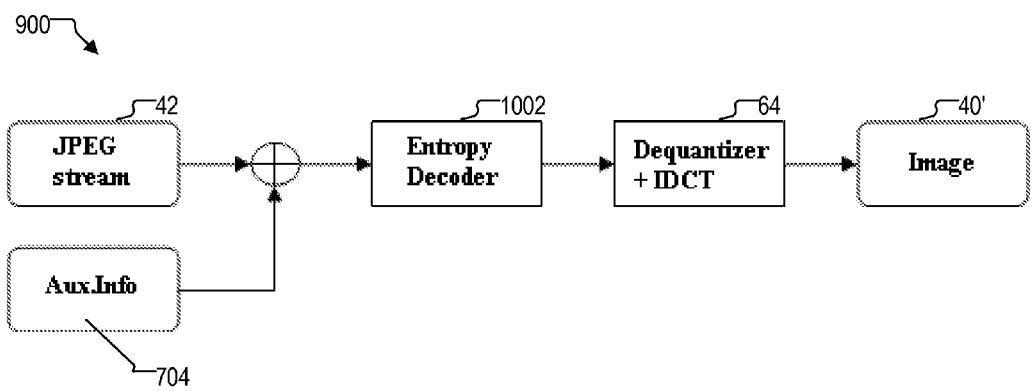
FIG. 9 is a block diagram of a decoder capable of using the restart marker indexing auxiliary information in the JPEG codec of one or more embodiments of the present disclosure.

FIG. 9 is a block diagram of a decoder 900 capable of using the restart marker index in auxiliary information 704 in the JPEG codec of one or more embodiments of the present disclosure. Decoder 900 includes an entropy decoder 1002 that receives bitstream 42 and auxiliary information 704 and generates quantized DCT coefficients, and a dequantization and inversed DCT decoder 64 that receives the quantized DCT coefficients and generates a lossy copy 40' of part or all of source image 40. Entropy decoder 902 can use auxiliary information 704 to accelerate JPEG decoding by quickly retrieving the MCUs needed for a certain operation, such as cropping, rotating, or editing, without parsing the entire bitstream.

Figures 10, 11:
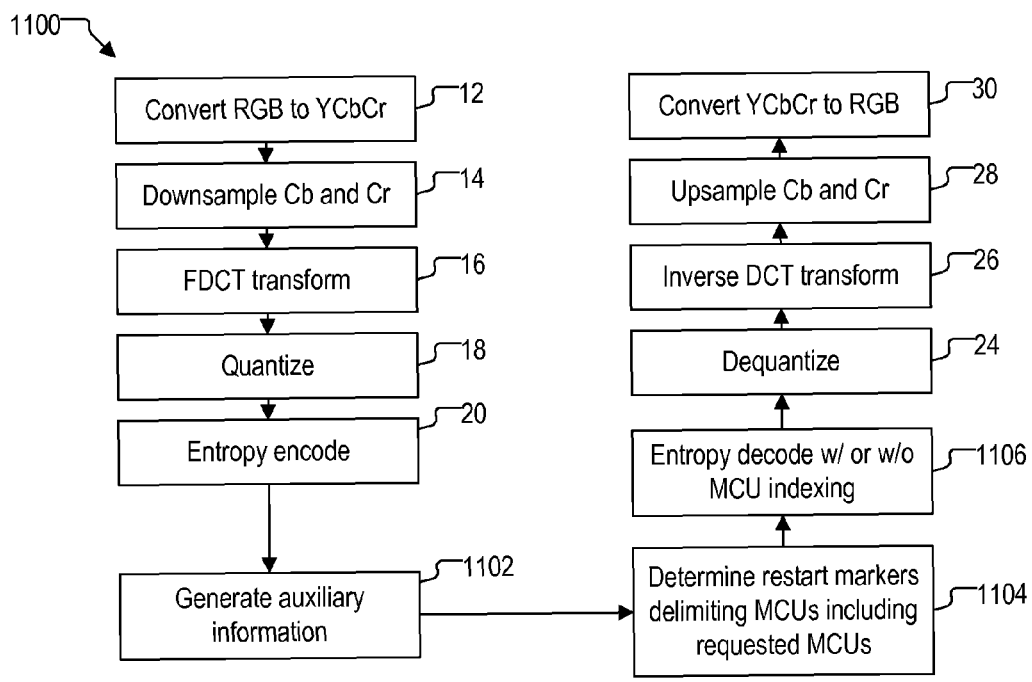
FIG. 10 illustrates the use of the auxiliary information in one or more embodiments of the present disclosure.
FIG. 11 is a flowchart of a method for the JPEG codec to generate and use the restart marker indexing auxiliary information in one or more embodiments of the present disclosure.

In an exemplary JPEG cropping illustrated in FIG. 10, a smaller image consisting of from (x4, y3) to (x6, y5) is cut from an original image. Based on the size of the original image and the size of the MCUs, it can be determined that the original image consists of 48 MCUs and MCUs 20 to 22, 28 to 30, and 36 to 38 make up the smaller image that need to be decoded and saved as a separate JPEG image. Conventionally all the MCUs in the original image would need to be decoded in order determine the boundaries between the MCUs of the smaller image in the bitstream. Note the size of the original image and the size of the MCUs are determined from a frame header in the bitstream.

Using auxiliary information 704, fewer MCUs need to be decoded. Assume auxiliary information 704 provides that the restart interval is eight MCUs, the total number of restart markers is five, and the bit offsets for the five restart markers. Based on the size of the original image, the size of the MCUs, the total number of restart markers, the restart interval, entropy decoder 902 determines the restart markers demarcating MCUs 20 to 22, 28 to 30, and 36 to 38. The restart markers may be a restart marker that marks the end of an entropy encoded segment of MCUs including the requested MCUs, one or more pairs of restart markers that mark the boundaries of entropy encoded segments of MCUs including the requested MCUs, and/or a restart marker that marks the start of an entropy encoded segment of MCUs including the requested MCUs. Entropy decoder 902 then retrieves only the entropy encoded segments of MCUs including MCUs 20 to 22, 28 to 30, and 36 to 38 based on the bit offsets of their restart markers.

For example, entropy decoder 902 can determine that the first entropy encoded segment of MCUs 1 to 8 are located before the first restart marker, the second entropy encoded segment of MCUs 9 to 16 are between the first and the second restart markers, . . . , and the sixth entropy encoded segment of MCUs 41 to 48 are after the fifth restart marker. Thus, entropy encoder 902 uses the second, the third, the fourth, and the fifth restart markers to retrieve the third, the fourth, and the fifth entropy encoded segments, and decodes those entropy encoded segments to find MCUs 20 to 22, 28 to 30, and 36 to 38. The smaller image from decoded MCUs 20 to 22, 28 to 30, and 36 to 38 may be displayed or encoded as another JPEG bitstream.

When decoding the retrieved MCUs, entropy decoder 902 may perform MCU indexing to expedite future processing as disclosed in U.S. Pat. No. 7,391,913 and U.S. Pat. No. 7,668,385, which are incorporated herein by reference.

FIG. 11 is a flowchart of a method 1100 for the JPEG codec to generate and use auxiliary information 704 in one or more embodiments of the present disclosure. Method 1100 may be implemented by dedicated hardware or a processor executing instructions loaded from a hard disk to a random access memory.

Method 1100 includes the above-described steps 12 to 20. Step 20 is followed by step 1102.

In step 1102, the codec generates auxiliary information 704 based on bitstream 42.

In step 1104, the codec receives a request for certain MCUs in bitstream 42. In response, the codec determines the restart markers that demarcate one or more entropy encoded segments of MCUs including the requested MCUs based on the size of the image, the size of the MCUs, the restart interval, and the number of restart markers. The codec then retrieves the entropy encoded segments of MCUs using the bit offsets of the corresponding restart markers.

In step 1106, the codec entropy decodes the entropy encoded segments of MCUs including the requested MCUs and optionally performs MCU indexing.

Step 1106 is followed by the above-described steps 24 to 30 performed for the entropy encoded segments of MCUs including the requested MCUs. The final image may be cropped to only include the requested MCUs and displayed. The final image may be encoded into another bitstream that is transmitted over a wired or wireless medium, or saved in a nonvolatile medium.

Various other adaptations and combinations of features of the embodiments disclosed are within the scope of the present disclosure. Although a codec has been described with various encoder and decoder blocks, the functions of those blocks may be combined, divided, or eliminated based on the desired implementation. Numerous embodiments are encompassed by the following claims.

What is claimed is:

1. A method for processing an image, comprising:
   searching for define restart interval and restart markers in a JPEG bitstream of the image;
   based on said searching, recording in an auxiliary information, using a processor, a restart interval, a total number of the restart markers, and bit offsets of the restart markers in the JPEG bitstream;
   inserting the auxiliary information as a reserved segment in the JPEG bitstream; and
   transmitting or saving the JPEG bitstream.

2. A method for processing a JPEG bitstream of an image, the JPEG bitstream including restart markers inserted at a restart interval between segments of minimum coded units (MCUs), the method comprising:
   parsing auxiliary information that was inserted as a reserved segment in the JPEG bitstream, the auxiliary information including the restart interval, a total number of the restart markers, and bit offsets of the restart markers in the JPEG bitstream;
   determining, using a processor, the restart interval, the total number of the restart markers, and the bit offsets of the restart markers in the JPEG bitstream included in the auxiliary information;
   receiving a request for MCUs;
   determining one or more restart markers that demarcate one or more segments of MCUs including the requested MCUs based on a size of the image, a size of the MCUs, the restart interval, and the total number of the restart markers;
   retrieving one or more segments of MCUs including the requested MCUs from the JPEG bitstream based on one or more bit offsets of the one or more restart markers;
   decoding the one or more segments of MCUs to form an other image composed of the requested MCUs;
   encoding the other image to form an other bitstream; and
   transmitting or saving the other bitstream.

3. The method of claim 2, further comprising displaying the other image.

* * * * *